US009294641B2

(12) United States Patent
Uno

(10) Patent No.: US 9,294,641 B2
(45) Date of Patent: Mar. 22, 2016

(54) IMAGE READING UNIT AND IMAGE READING APPARATUS

(71) Applicant: Mayu Uno, Nagoya (JP)

(72) Inventor: Mayu Uno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 153 days.

(21) Appl. No.: 13/627,240

(22) Filed: Sep. 26, 2012

(65) Prior Publication Data

US 2013/0135692 A1 May 30, 2013

(30) Foreign Application Priority Data

Nov. 30, 2011 (JP) ................................. 2011-262886

(51) Int. Cl.
G06F 3/12 (2006.01)
G06K 1/00 (2006.01)
G06F 15/00 (2006.01)
H04N 1/403 (2006.01)
H04N 1/41 (2006.01)
H04N 1/00 (2006.01)
H04N 1/203 (2006.01)
H04N 1/12 (2006.01)

(52) U.S. Cl.
CPC ............. *H04N 1/0057* (2013.01); *H04N 1/203* (2013.01); *H04N 1/12* (2013.01)

(58) Field of Classification Search
CPC ....... H04N 1/0057; H04N 1/203; H04N 1/12; G03G 15/04
USPC ................ 358/474, 538, 1.12, 1.18
See application file for complete search history.

(56) References Cited

U.S. PATENT DOCUMENTS

| 6,285,441 | B1 | 9/2001 | Takahara | |
|---|---|---|---|---|
| 7,595,913 | B2 | 9/2009 | Hirayama | |
| 7,649,659 | B2* | 1/2010 | Nabemoto | H04N 1/00358 358/1.12 |
| 2002/0097450 | A1* | 7/2002 | Yokota et al. | H04N 1/03 358/474 |
| 2005/0073087 | A1 | 4/2005 | Kadowaki et al. | |
| 2006/0087704 | A1 | 4/2006 | Hirayama | |
| 2006/0152772 | A1 | 7/2006 | Sawada | |
| 2007/0127087 | A1* | 6/2007 | Nabemoto | H04N 1/00358 358/468 |

FOREIGN PATENT DOCUMENTS

| CN | 1767581 A | 5/2006 |
|---|---|---|
| CN | 102006390 A | 4/2011 |
| EP | 1650949 A1 | 4/2006 |
| JP | 05-068170 U | 9/1993 |

(Continued)

OTHER PUBLICATIONS

Sep. 28, 2014—(CN) Notice of First Office Action—App 201210366062.5—English Translation.

*Primary Examiner* — Akwasi M Sarpong
(74) *Attorney, Agent, or Firm* — Banner & Witcoff, Ltd.

(57) ABSTRACT

An image reading apparatus including a contact image sensor module, a holder, and an urging member is provided. The contact image sensor module may extend in a first direction and include a shaft extending in the first direction and a protrusion protruding from the contact image sensor module in a second direction. The holder may accommodate the contact image sensor module and include an insertion section, in which a leading edge of the shaft is inserted, and a contact section contacting the protrusion from one side in the first direction. The first urging member may urge the contact image sensor module toward the one side in the first direction.

11 Claims, 10 Drawing Sheets

(56) References Cited

FOREIGN PATENT DOCUMENTS

| JP | 09-270896 A | 10/1997 |
| JP | 11-168592 A | 6/1999 |
| JP | 2002-218172 A | 8/2002 |
| JP | 2004-266314 A | 9/2004 |
| JP | 2007-013309 A | 1/2007 |
| WO | WO 2007013309 A1 * | 2/2007 |

* cited by examiner

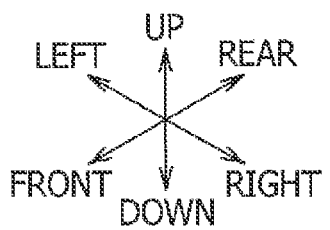
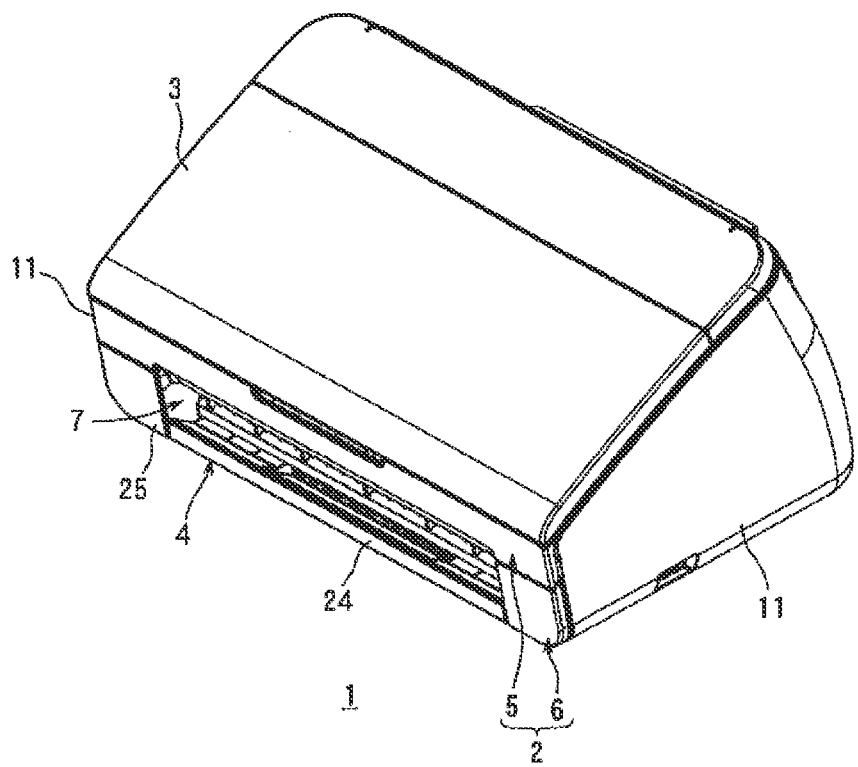
FIG. 1

IMAGE READING UNIT AND IMAGE READING APPARATUS

CROSS REFERENCE TO RELATED APPLICATION

This application claims priority from Japanese Patent Application No. 2011-262886, filed on Nov. 30, 2011, the entire subject matter of which is incorporated herein by reference.

BACKGROUND

1. Technical Field

An aspect of the disclosure relates to an image reading unit and an image reading apparatus with the image reading unit.

2. Related Art

In an image scanner including a contact image sensor (i.e., CIS), due to a smaller depth of field, it may be required that an image sensor of the CIS is located in an accurately correct position with respect to a contact glass.

For example, the image sensor may be placed in a housing of the CIS. Two shafts, extending in a longitudinal direction of the housing, may be formed in the housing in spaced-apart positions from each other along the longitudinal direction. Further, in the housing, a cutout may be formed. Meanwhile, a holder to hold the CIS may be formed to have two rotational holes and a protrusion. When the shafts in the housing are inserted in the rotational holes of the holder, and the cutout in the housing is engaged with the projection of the holder, the image sensor can be placed in the predetermined position in the image scanner along the longitudinal direction.

SUMMARY

According to the configuration described above, however, due to manufacturing errors or differences between diameters of the shafts and the rotational holes and between lengths of the cutout and the protrusion, the image sensor may move in the holder. Thus, the image sensor may not be accurately fit in the predetermined position.

An aspect of the disclosure may be advantageous in that an image reading unit, in which a contact image sensor module can be placed in an accurately correct position, and an image reading apparatuses having the image reading unit, are provided.

According to an aspect of the disclosure, an image reading apparatus may include a sheet conveyer configured to convey a sheet, a first image reader configured to read an image of one side of the sheet, a second image reader configured to read an image of the other side of the sheet, and an image reading unit included in at least one of the first image reader and the second image reader. The image reader unit may include a contact glass extending in a first direction, a contact image sensor module extending in the first direction and including a shaft extending in the first direction and a protrusion protruding from the contact image sensor module in a second direction, the second direction being orthogonal to the first direction. The image reader unit may further include a holder configured to accommodate the contact image sensor module and comprising an insertion section, in which a leading edge of the shaft is inserted, and a contact section contacting the protrusion from one side in the first direction, and a first urging member interposed between the contact image sensor module and the holder and configured to urge the contact image sensor module toward the one side in the first direction.

According to an aspect of the disclosure, an image reading unit may include a contact glass extending in a first direction, a contact image sensor module extending in the first direction and including a shaft extending in the first direction and a protrusion protruding from the contact image sensor module in a second direction, the second direction being orthogonal to the first direction, a holder configured to accommodate the contact image sensor module and including an insertion section, in which a leading edge of the shaft is inserted, and a contact section contacting the protrusion from one side in the first direction, and a first urging member interposed between the contact image sensor module and the holder and configured to urge the contact image sensor module toward the one side in the first direction.

According to an aspect of the disclosure, an image reading apparatus may include a contact image sensor module extending in a first direction and including a shaft extending in the first direction and a protrusion protruding from the contact image sensor module in a second direction, the second direction being orthogonal to the first direction, a holder configured to accommodate the contact image sensor module, the holder including an insertion section, in which a leading edge of the shaft is inserted, and a contact section contacting the protrusion from one side in the first direction, and an urging member interposed between the contact image sensor module and the holder and configured to urge the contact image sensor module toward the one side in the first direction.

BRIEF DESCRIPTION OF THE ACCOMPANYING DRAWINGS

FIG. 1 is a perspective view of an image scanner 1 in an unused orientation.

Figure 4:
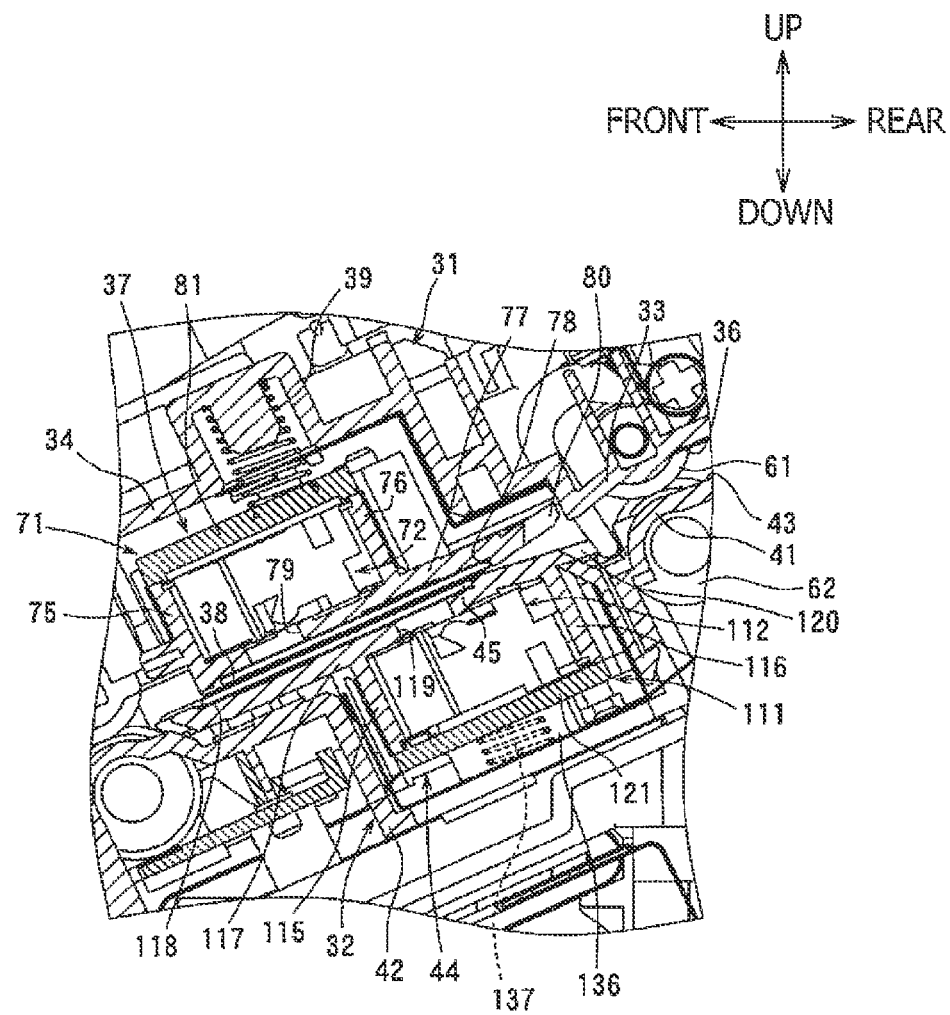

FIG. 4 is a cross-sectional enlarged view of an upper CIS unit 37 and a lower CIS unit 44 in the image scanner 1.

Figure 5:
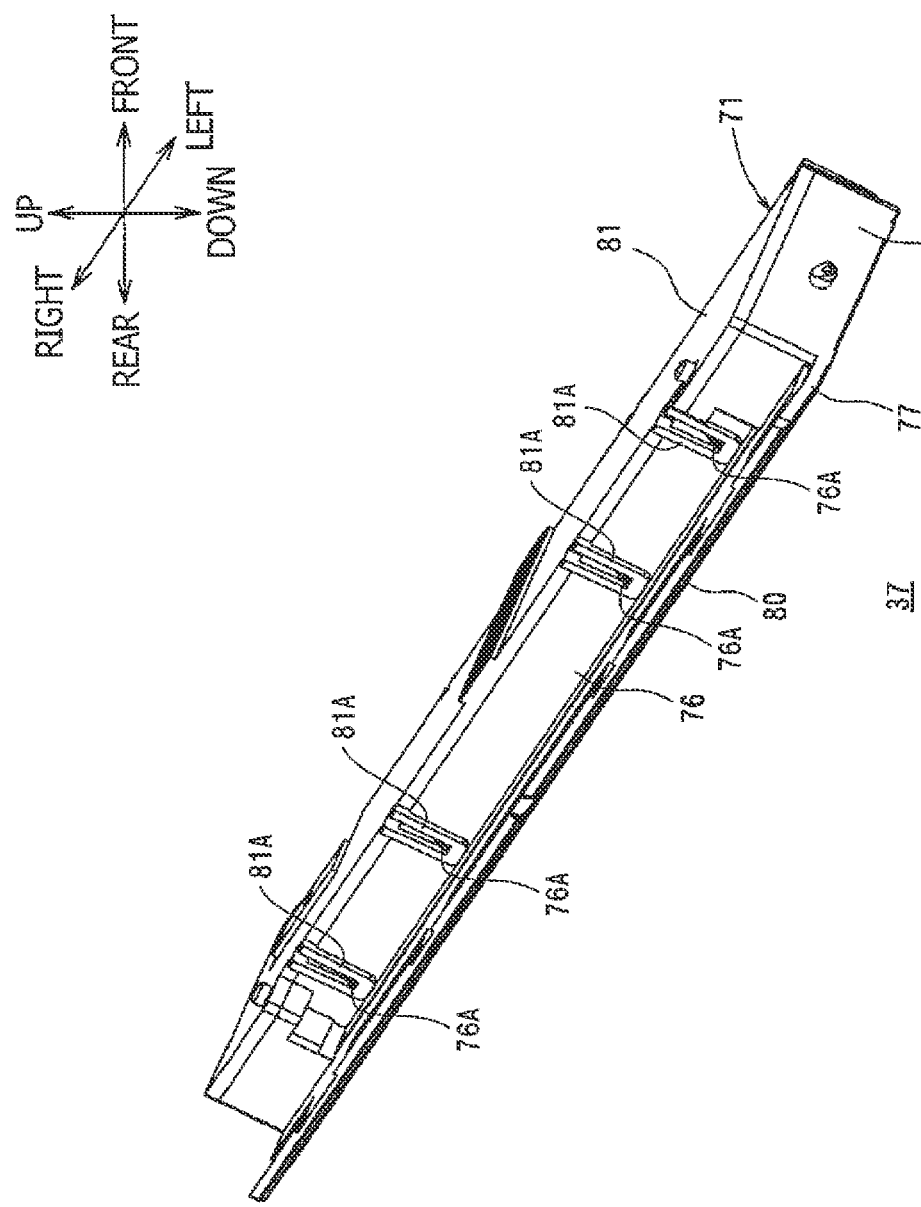

FIG. 5 is a perspective view of the upper CIS unit 37 in the image scanner 1.

Figure 6:
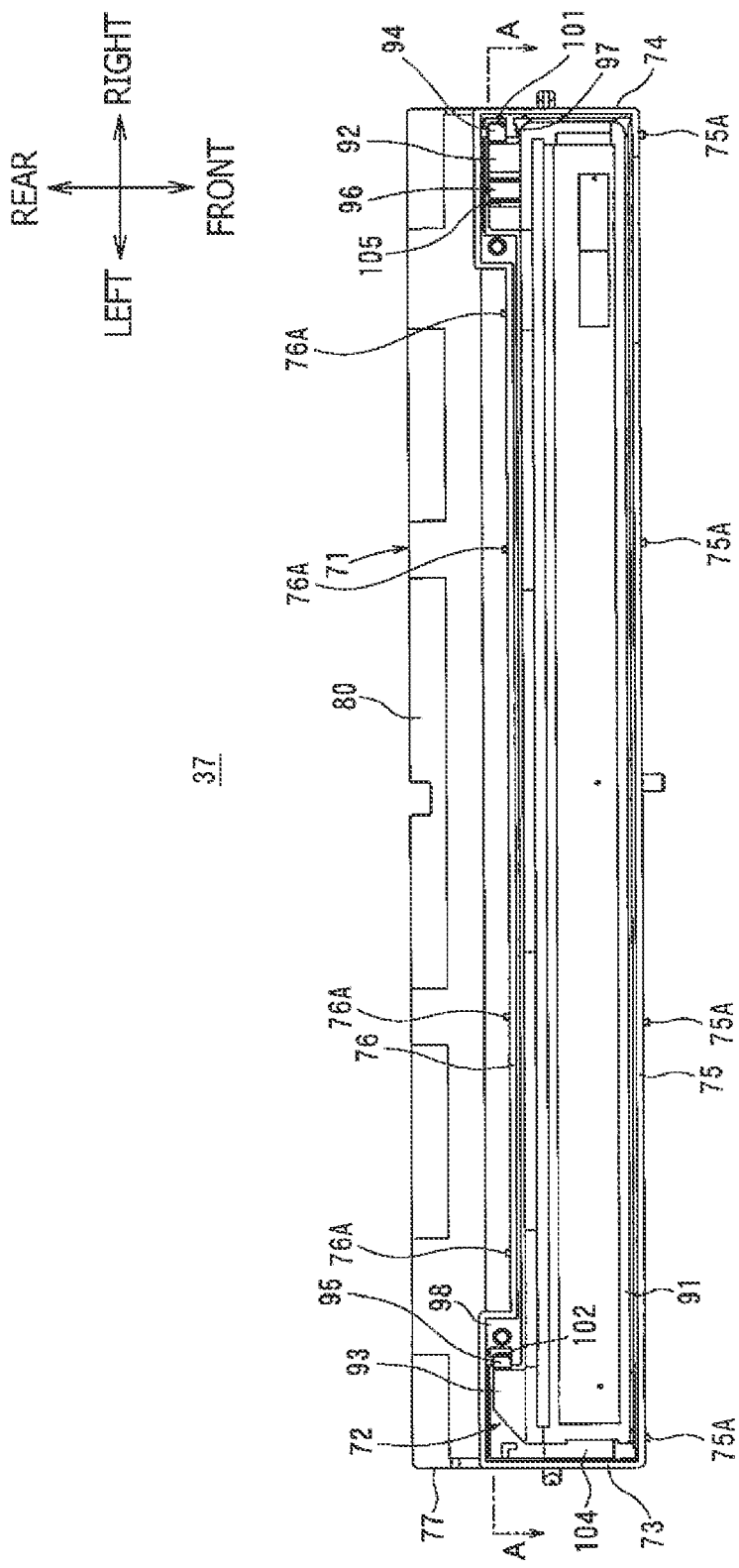

FIG. 6 is a top view of the upper CIS unit 37 in the image scanner 1 with a closure panel 81 being removed.

Figure 7:
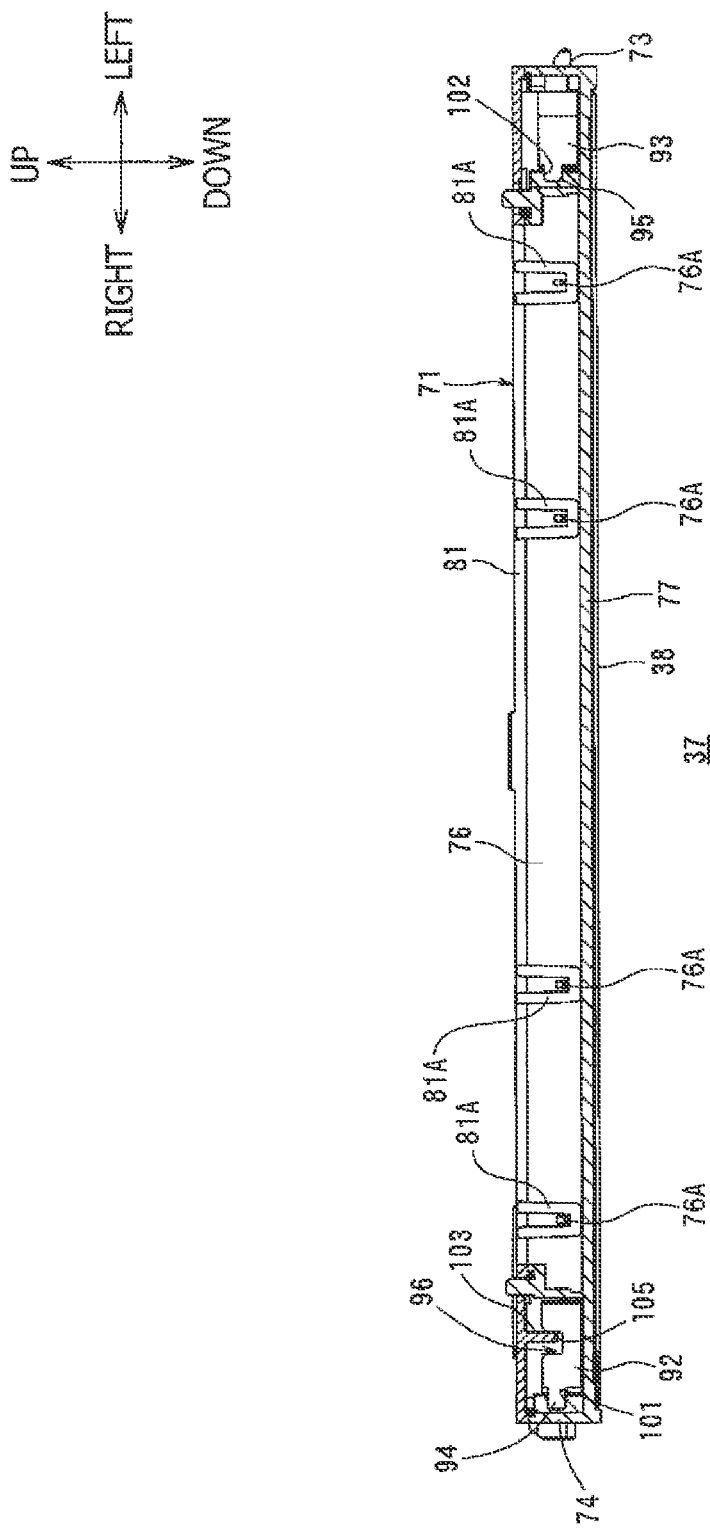

FIG. 7 is a cross-sectional view of the upper CIS unit 37 in the image scanner 1 taken along a line A-A shown in FIG. 6.

Figure 8:
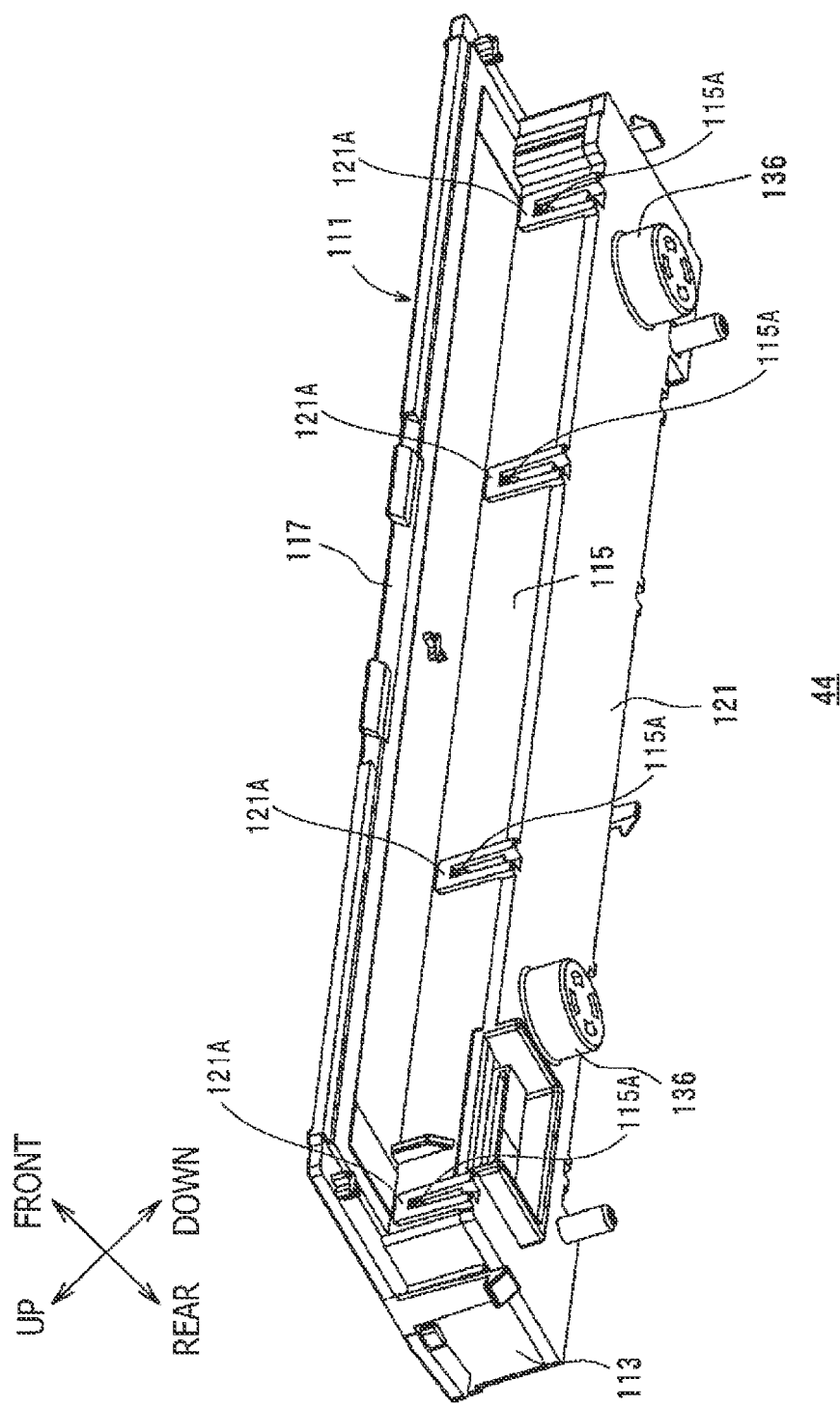

FIG. 8 is a perspective view of the lower CIS unit 44 in the image scanner 1.

Figure 9:
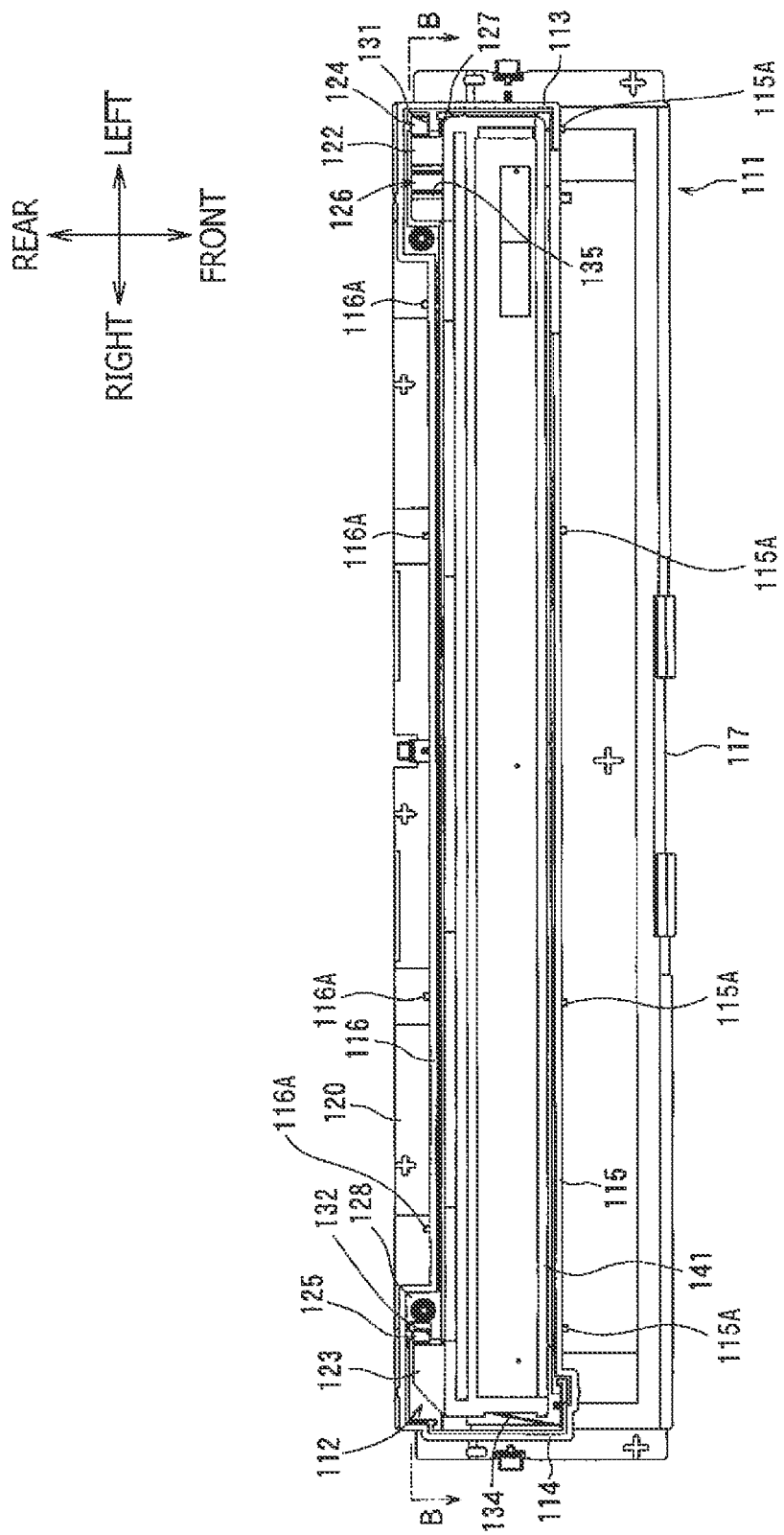

FIG. 9 is a bottom view of the lower CIS unit 44 in the image scanner 1 with the closure panel 81 being removed.

Figure 10:
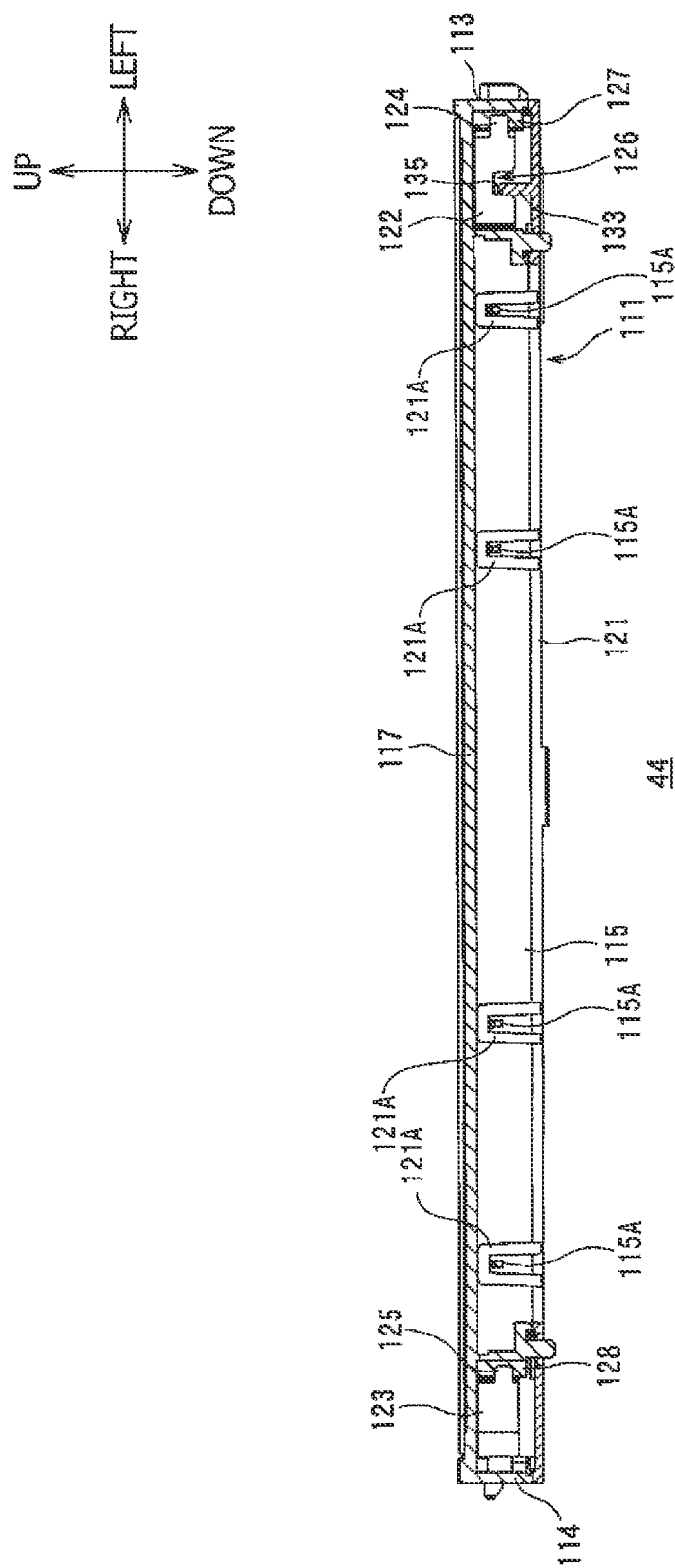

FIG. 10 is a cross-sectional view of the lower CIS unit 44 in the image scanner 1 taken along a line B-B shown in FIG. 9.

DETAILED DESCRIPTION

Hereinafter, the image scanner 1 as an example embodiment of the image reading apparatus according to the disclosure will be described with reference to the accompanying drawings.

External Structure of the Image Scanner

As shown in FIG. 1, the image scanner 1 includes a main body 2, a feeder tray 3, and a discharge tray 4.

The main body 2 includes an upper unit 5 and a lower unit 6. On a front face of the main body 2, a sheet discharge outlet 7 is formed partially over the upper unit 5 and the lower unit 6.

In the example embodiment described below, directions concerning the image scanner 1 will be referred to based on orientations indicated by arrows shown in each drawing. For example, a viewer's lower-left side appearing in FIG. 1, on which the sheet discharge outlet 7 is formed, is referred to as the front face for a user of the image scanner 1. An upper-right side in FIG. 1, opposite from the front, is referred to as rear. A side, which corresponds to the viewer's upper-left side is referred to as a left-side face, and an opposite side from the left, which corresponds to the viewer's lower-right side, is referred to as a right-side face. The right-left direction of the image scanner 1 may also be referred to as a crosswise or lateral direction. The up-down direction in FIG. 1 corresponds to a vertical direction of the image scanner 1.

The upper unit 5 is swingably coupled to the lower unit 6 to swing about an axis, which extends along an upper front edge of the lower unit 6 in the crosswise direction. By swinging, the upper unit can change orientations thereof from a regular orientation (see FIG. 2), in which the upper unit 5 is inclined to be lower along a rear-to-front direction, to a maintenance orientation (not shown), in which a rear end of the upper unit 5 is uplifted from the lower unit 6, and vice versa. When the upper unit 5 is in the maintenance orientation, the upper unit 5 and the lower unit 6 is spaced apart from each other, and internal components in the main body 2 can be accessed by the user. Thus, the user can handle, for example, paper jam or other maintenance operations.

Figure 2:
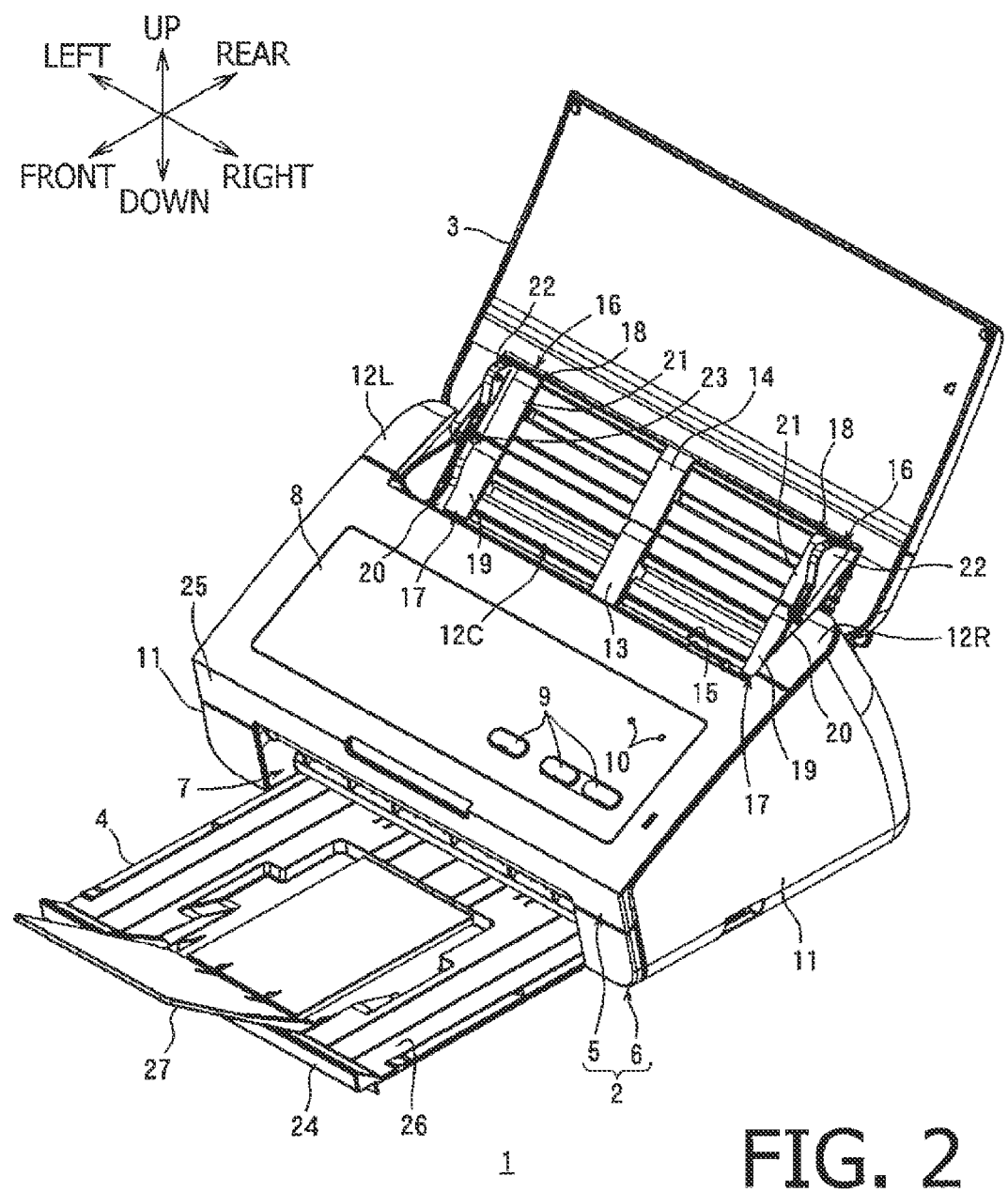
FIG. 2 is a perspective view of the image scanner 1 in a regular orientation.

On a top surface of the upper unit 5, as shown in FIG. 2, an operation display 8 including a plurality of operation buttons 9 and pilot lamps 10 is arranged.

The lower unit 6 includes a pair of lateral panels 11, which are formed in trapezoidal shapes in a lateral view and arranged on lateral (i.e., right and left) sides of the lower unit 6. The lateral panels 11 form the right and left faces of the image scanner 1. When the upper unit 5 is in the regular orientation, the upper unit 5 is interposed between the lateral panels 11 to be covered from right and left by the lateral panels 11. When the upper unit 5 is in the regular orientation, the top surface of the upper unit 5 aligns in a same plane with upper edges of the lateral panels 11.

At an upper rear end in the lower unit 6, a top plane of a laterally central area 12C inclines downward toward the front along the rear-to-front direction. On the top plane of the central area 12C, a rectangular-shaped on-body guide piece 13 is fixed in a laterally central position.

A left-side end 12L and a right-side end 12R of the central area 12C are rectangular-sided walls protruding upward with respect to the top plane of the central area 12C. When the upper unit 5 is in the regular orientation, upper planes of the left-side end 12L and the right-side end 12R align in a same plane with the top plane of the upper unit 5. On a rightward surface of the left-side end 12L and a leftward surface of the right-side end 2R, tray support shafts (not shown), which extend in the crosswise direction inwardly and coaxially, are formed.

The feeder tray 3 is swingably supported by the tray support shafts to swing about the tray support shafts. Therefore, by swinging, the feeder tray 3 is movable between a housed position (see FIG. 1), in which the feeder tray 3 faces the upper plane of the main body 2 from above, and a usable position (see FIG. 2), in which the feeder tray 3 extends from the upper rear end of the main body 2 in a same or approximately same inclination angle as the inclination of the central area 12C of the upper rear end of the lower unit 6. The feeder tray 3 is formed in a shape of a plane panel, which is in a same or approximately same planar shape as the top plane of the main body 2. Therefore, when the feeder tray 3 is in the housed position, the top plane of the main body 2 is covered by the feeder tray 3.

On an inner side of the feeder tray 3, which is a side facing upward when the feeder tray is in the usable position, an on-tray slider piece 14 is provided. The on-tray slider piece 14 is fixed in a laterally central position and in a front end position on the upward side of the feeder tray 3, when the feeder tray 3 is in the usable position, in a rearward position with respect to the on-body slider piece 13.

When the feeder tray 3 is in the usable position, a sheet feeding inlet 15, which is formed in a frontward position with respect to the upper rear end and laterally central area 12C of the lower unit 6, is exposed. The sheet feeding inlet 15 is formed in a rectangular shape spreading in the crosswise direction.

When the feeder tray 3 is in the usable position, a pair of width-position guide 16 is arranged over a lower front part of the feeder tray 3 and the laterally central area 12C in the upper rear end of the lower unit 16.

Each of the width-position guides 16 includes an on-body width guide piece 17 and an on-tray width guide piece 18.

The on-body width guide piece 17 includes a placement part 19 and a restricting part 20, which are formed integrally. The placement part 19 is arranged along the top plane of the central area 12C and is formed in a shape of rectangular plate. The placement part 19 is formed in the same or approximately same shape as the shape of the on-body slider piece 13. The restricting part 20 is formed to erect from a laterally outer edge of the placement part 19 orthogonally with respect to the placement part 19. In this regard, "orthogonally" includes not only planes intersecting at 90 degrees but also "intersecting at substantially right angles)" with some additional margins.

The on-tray width guide piece 18 includes a placement part 21 and a restricting part 22, which are formed integrally. The placement part 21 is arranged along the top plane of the central area 12C and is formed in a shape of rectangular plate. The placement part 21 is formed in the same or approximately same shape as the shape of the on-tray slider piece 14. The restricting part 22 is formed to erect from a laterally outer edge of the placement part 21 orthogonally with respect to the placement part 21.

The on-body width guide piece 17 has a joint shaft 23 extending in the crosswise direction on a rear end of the restricting part 20. An axis of the joint shaft 23 coincides with the axis of the tray support shafts (not shown) being the swing axis of the feeder tray 3. A part of the restricting part 22 of the on-tray width guide piece 18 laterally overlaps the rear end of the restricting part 20 of the on-body width guide piece 17, and the joint shaft 23 of the on-body width guide piece 17 penetrates the overlapped part of the on-tray width guide piece 18. Thereby, the on-tray width guide piece 18 swings about the joint shaft 23 along with the swing movement of the feeder tray 3. When the feeder tray 3 is in the usable position, the on-body width guide piece 17 and the on-tray width guide piece 18 align along the front-rear direction, and the restricting parts 20, 22 form a rib extending in the front-rear direction.

The pair of width-position guides 16 are movable in the crosswise direction to be closer to and farther from each other for a same amount with respect to a crosswise center between the width-position guides 16.

When the width-position guides 16 are in mutually closest positions, a crosswise distance between the restricting part 20, the restricting part 22 on the right-hand side and the restricting part 20, the restricting part 22 on the left-hand side is, for example, substantially equivalent to a length of shorter sides of a name card. Therefore, a sheet in the size of a name card can be placed in the midst position between the pair of sheet-width guides 16 over the placement parts 19 of the on-body slider pieces 13 and the placement parts 21 of the on-tray slider pieces 14.

When the width-position guides 16 are in mutually farthest positions, a crosswise distance between the restricting part 20, the restricting part 22 on the right-hand side and the restricting part 20, the restricting part 22 on the left-hand side is, for example, substantially equivalent to a length of shorter sides of a legal-sized sheet. Therefore, a legal-sized sheet can be placed in the midst position between the pair of sheet-width guides 16 with a front end part of the sheet laid over the placement parts 19 of the on-body slider pieces 13 and the placement parts 21 of the on-tray slider pieces 14.

A sheet larger than the name card and smaller than the legal size may be placed in the midst position between the pair of sheet-width guides 16 over the placement parts 19 of the on-body slider pieces 13 and the placement parts 21 of the on-tray slider pieces 14 by moving the width-position guides 16 in crosswise positions, in which distance between the restricting parts 20, 22 coincides with the width of the sheet.

Thus, the sheet can be placed in the position over the upper rear end of the lower unit 6 in the main body 2 and on the feeder tray 3 with the widthwise center thereof being coincident with the crosswise center between the width-position guides 16, i.e., coincident with the crosswise center in the sheet feeding inlet 15.

The discharge tray 4 is formed in a shape of a flat rectangular. The discharge tray 4 is movable between a housed position (see FIG. 1), in which the discharge tray 4 is stored in a bottom part of the lower unit 6, and a frontward position (see FIG. 2), in which the discharge tray 4 is drawn out frontward from the bottom part through the sheet discharge opening 7. When the discharge tray 4 is in the housed position, as shown in FIG. 1, a front face 24 of the discharge tray 4 aligns in a same plane with a front face 25 of the main body 2. When the discharge tray 4 is drawn frontward out of the main body 2, as shown in FIG. 2, an upper surface 26 of the discharge tray 4 becomes usable to serve as a sheet catching plane, in which a discharged sheet can be settled.

On the upper surface 26 of the discharge tray 4, an extension panel 27 to support the discharged sheet is arranged. The extension panel 27 is swingable about a swing axis, which extends along a front edge of the discharge tray 4. The extension panel 27 is swingable between a flat position (not shown), in which the extension panel 27 lays flat on the upper surface 26, and an extended position (see FIGS. 2 and 3), in which, when the discharge tray 4 is drawn out of the main body 2, the extension panel 27 extends from the front edge of the upper surface 26 toward upper front.

Internal Configuration of the Image Scanner

Figure 3:
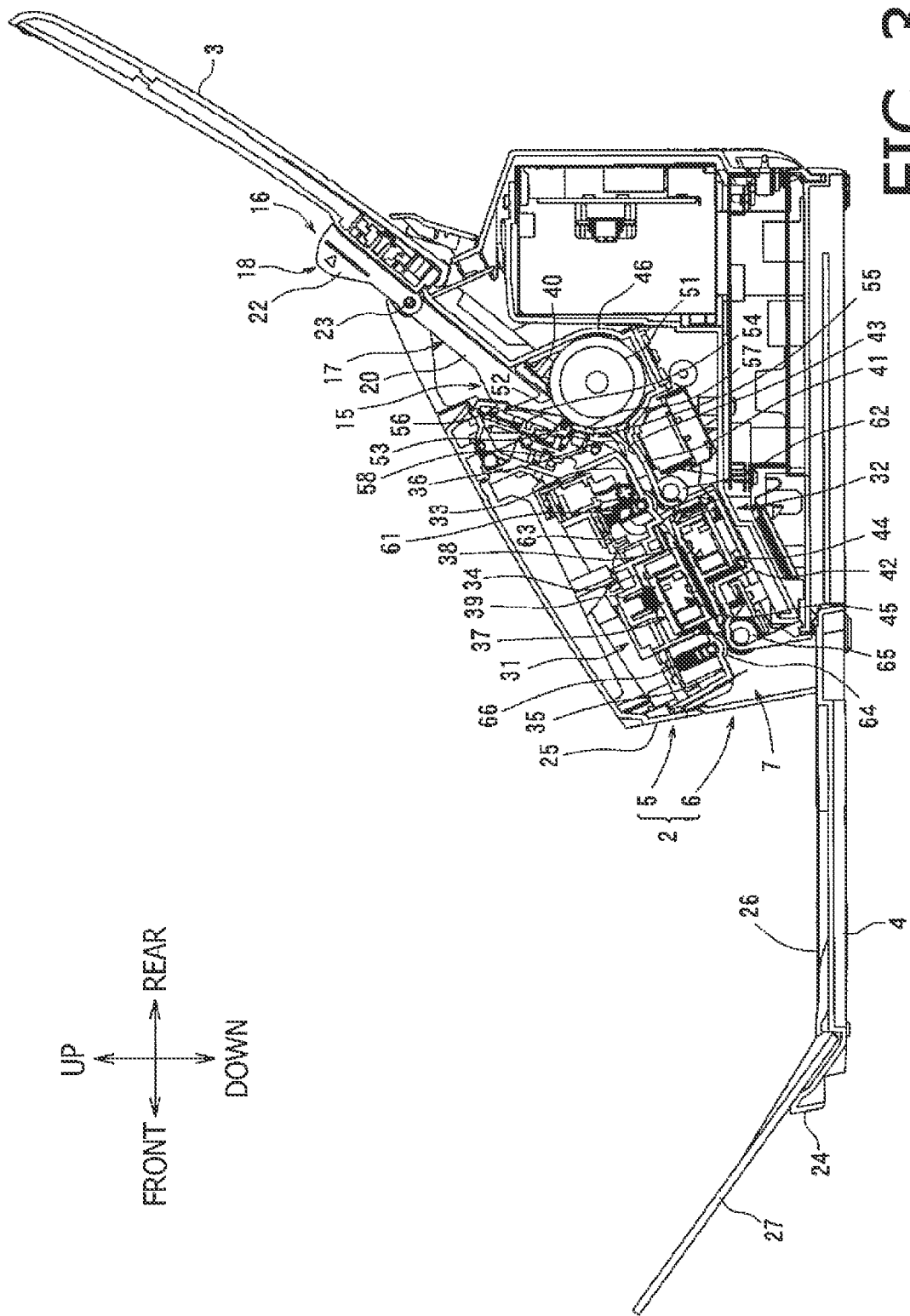
FIG. 3 is a cross-sectional side view of the image scanner 1.

As shown in FIG. 3, the upper unit 5 and the lower unit 6 have an upper frame 31 and a lower frame 32 respectively. A rear end of the upper frame 31 and a rear end of the lower frame 32 form edges of the sheet feeding inlet 15.

As shown in FIG. 4, the upper frame 31 has a first upper guide section 33, an upper CIS holder section 34, and an end guide section 35, which are continuously formed in the order mentioned above along the rear-to-front direction.

A lower surface of the first upper guide section 33, which faces the lower frame 32, forms a guide surface 36 for guiding the sheet to be conveyed. The guide surface 36 is formed to incline at a relatively steep angle toward lower front along the upper-rear to lower-front direction. Further, the guide surface 36 is curved toward lower rear and extends toward lower front at relatively moderate inclination.

The upper CIS holder section 34 is formed in a shape of rectangle, which recesses (protrudes) toward upper front. In the recessed area of the upper CIS holder section 34, an upper CIS unit 37 is accommodated to fit in the rectangular shape. The upper CIS unit 37 includes a piece of contact glass 38, and the upper CIS unit 37 is arranged in the upper CIS holder section 34 with the contact glass 38 facing the lower frame 32. In a position between a top plane (i.e., ceiling) of the upper CIS holder section 34 and the upper CIS unit 37, a coil spring 39 is arranged. With the coil spring 39, the upper CIS unit 37 may be moved toward or away from a sheet path, depending on thickness of the sheet being conveyed, so that the contact glass 38 may be in closely contact with the sheet whilst the sheet is conveyed.

The end guide section 35 (see FIG. 3) is formed to extend toward lower front along the upper-rear to lower-front direction at a substantially same angle as the inclination angle of a front end section of the guide surface 36.

The lower frame 32 has an inlet guide 40, a first lower guide section 41, and a lower CIS holder section 42, which are continuously formed in the order mentioned above along a rear-to-front direction.

An upper plane of the inlet guide 40 forms a flat surface, and the inlet guide 40 is arranged to have the upper plane inclined toward lower front along the upper-rear to lower-front direction at a substantially same angle as the inclination of the upper planes of the on-body slider pieces 13, the on-tray slider pieces 14, and the placement surfaces 19, 21 of the width-position guides 16.

An upper surface of the first lower guide section 41, which faces the upper frame 31, forms a guide surface 43 for guiding the sheet to be conveyed. The guide surface 43 is arranged to be spaced apart from the guide surface 36 of the first upper guide section 33. The guide surface 43 is curved toward lower rear and extends toward lower front in parallel with the front end section of the guide surface 36. In this regard, planes extending "in parallel" with each other may include one of the planes extending along with the other plane at an angled orientation or one of the planes being curved moderately extending along with the other plane.

The lower CIS holder section 42 is formed in a shape of rectangle, which recesses (protrudes) toward lower rear. In the recessed area of the lower CIS holder section 42, a lower CIS unit 44 is accommodated to fit in the rectangular shape. The lower CIS unit 44 includes a piece of contact glass 45, and the lower CIS unit 44 is arranged in the lower CIS holder section 42 with the contact glass 45 facing the upper frame 31.

The lower frame 32 is further formed to have a feed roller housing 46, which recesses toward lower rear, in a range over laterally central areas in the inlet guide 40 and the first lower guide section 41.

In the feed roller housing 46, a feed roller 51 is rotatably arranged. A part of a circumference of the feed roller 51 protrudes upwardly from the level of the upper planes of the inlet guide 40 and the first lower guide section 41. When the sheet is conveyed, the feed roller 51 rotates in a predetermined direction (e.g., in a counterclockwise direction when viewed from a right-hand side, as seen in FIG. 3).

In a range over the upper plane of the inlet guide 40 and the protrusive part of the circumference of the feed roller 51, a guide sheet 52 being a piece of film is provided. The guide sheet 52 is arranged to have a crosswise center thereof to coincide with a crosswise center of the feed roller 51. The guide sheet 52 is fixed to the upper plane of the guide inlet 40 at a rear end portion thereof, and a front end being a leading edge is in contact with the circumference of the feed roller 51.

In an upper front position with respect to the feed roller 51, a restricting member 53, a sheet presser 54, and a separator unit 55 are arranged. The restricting member 53, the sheet presser 54, and the separator unit 55 are attached to the upper frame 31.

The restricting member 53 is arranged in a downstream position with respect to the guide sheet 52 along a sheet conveying direction, in which the sheet flows from the feeder tray 3 to the discharge tray 4. The restricting member 53 is formed to have a cross-sectional shape of a triangle, when viewed along the crosswise direction (see FIG. 3), with an acute angle thereof pointing toward the feed roller 51. The restricting member 53 has a restricting plane 56, which extends collinearly with a radius of the feed roller 51 and orthogonally to a line extending along the upper plane of the inlet guide 40.

The sheet presser 54 includes a blade spring. A rear end of the sheet presser 54 is attached to the rear end of the upper frame 31, and a front end being a leading edge of the sheet presser 54 is in contact with an upper front position on the circumference of the feed roller 51.

The separator unit 55 includes a rubber-made separator piece 57. The separator piece 57 is arranged in a downstream position with respect to the restricting member 53 along a rotational direction of the feed roller 51. The separator piece 57 is resiliently urged against the circumference of the feed roller at a surface thereof by expanding force of a spring 58

On front ends of the first upper guide section 33 and the first lower guide section 41, respectively, LF rollers 61, 62 are arranged to rotate about axes, which extend along the crosswise direction. The LF roller 61 partially protrudes toward lower rear with respect to a lower plane of the front end of the first upper guide section 33. Meanwhile, the LF roller 62 partially protrudes toward upper front with respect to the front end of the first lower guide section 41. The LF roller 61 is urged against the LF roller 62 in the upper-front to lower-rear direction by expanding force of a spring 63 to have the circumference thereof to be in contact with the circumference of the LF roller 62.

On front ends of the end guide section 35 of the upper frame 31 and the lower frame 32, respectively, discharge rollers 64, 65 are arranged to rotate about axes, which extend along the crosswise direction. The discharge roller 64 partially protrudes toward lower rear with respect to a lower plane of the front end of the end guide section 35. Meanwhile, the discharge roller 65 partially protrudes toward upper front with respect to the front end of the lower frame 32. The discharge roller 64 is urged against the discharge roller 65 in the upper-front to lower-rear direction by expanding force of a spring 66 to have the circumference thereof to be in contact with the circumference of the discharge roller 65.

Image Reading Operation in the Image Scanner

The image scanner 1 can read an image appearing on a selected side between the upper and lower sides of the sheet whilst the sheet is conveyed in the image scanner 1. Further, the image scanner 1 can read images appearing on both upper and lower sides of the sheet concurrently whilst the sheet is conveyed. An exemplary operation to convey the sheet and read the images in time series will be described.

Upon starting of the operation, the width-position guides 16 are moved (if necessary) to positions, in which the distance between the width-position guides 16 coincides with the width of the sheet to be read. Thereafter, the sheet to be read is placed on the feeder tray 3 and inserted from upper rear to be set in the position between the width-position guides 16. Thus, the sheet is placed on the on-body slider piece 13, the on-tray slider piece 14, and on the placement surfaces 19, 21 of the width-position guides 16. In this regard, the front end of the sheet slides on the on-body slider piece 13, the on-tray slider piece 14, and on the placement surfaces 19, 21 of the width-position guides 16 to be directed to the sheet feeder inlet 15. The front end of the sheet is further slidably moved through the sheet feeder inlet 15 over the inlet guide 40 in the lower frame 32 to the feed roller 51.

The sheet is moved further to the position over the guide sheet 52 from the inlet guide 40. In particular, a crosswise central area in the front end of the sheet moves to the position over the guide sheet 52. In this regard, when a plurality of sheets are placed in a stack on the feeder tray 3, a sheet at a lowermost position in the stack is moved to have the front end thereof on the guide sheet 52. The central area in the front end of the sheet slides on the guide sheet 52 to be directed to a position on the circumference of the feed roller 51. There, the front end of the sheet comes in contact with the separator unit 55, and the sheet is stopped thereat by frictional resistance from the separator unit 55. If one or more sheets sit on the lowermost sheet, the upper sheets are stopped thereat when the front ends thereof come in contact with the restricting plane 56 of the restricting member 53. Thus, the sheets are set thereat and ready to be conveyed.

As the sheets are inserted, the leading edge of the sheet presser 54 is uplifted, and the sheet presser 54 contacts an upper surface of the sheets. In this regard, due to resiliency of the sheet presser 54, the lowermost sheet is pressed against the circumference of the feed roller 51

As the feed roller 51 rotates in the counterclockwise direction, when viewed from the right-hand side (see FIG. 3), the lowermost sheet is moved along with the circumference of the feed roller 51 by the friction force caused between the lowermost sheet and the circumference of the feed roller 51. Further, due to the friction force between the lowermost sheet and a second lowermost sheet, the second sheet may move along with the lowermost sheet. However, when the front ends of the lowermost sheet and the second sheet contact the separator piece 57, the second sheet is restricted from being further moved by the separator piece 57. Thus, as the lowermost sheet is moved further, the lowermost sheet is separated from the second sheet. The separated lowermost sheet passes through a nipped area between the separator piece 57 and the circumference of the feed roller 51.

The sheet passing though the nipped area is guided by the guide surface 36 of the first upper guide section 33 and the guide surface 43 of the first lower guide section 41 to be conveyed in a conveyer path, which is formed between the guide surface 36 and the guide surface 43.

When the front end of the sheet comes in contact with a nipped area between the LF rollers 61, 62, whilst the LF rollers 61, 62 rotate, the front end of the sheet is drawn into the nipped area. Thus, the upper surface and the lower surface of the sheet contact the circumferences of the LF rollers 61, 62, respectively, and conveying force from the LF rollers 61, 62 is applied to the sheet. Thereby, the sheet is conveyed further.

As the sheet is conveyed further, the upper surface of the sheet faces the contact glass 38 in the upper CIS unit 37, and the lower surface of the sheet faces the contact glass 45 in the lower CIS unit 44. There, in light emitting positions, the upper and lower surfaces of the sheet are exposed to light emitted from upper and lower light sources (not shown). The emitted light is reflected on the upper and lower surfaces of the sheet and received by image sensors (not shown), which are installed in the upper CIS unit 37 and the lower CIS unit 44. Thus, the images appearing on the upper and lower surfaces of the sheet are read.

When the front end of the sheet comes in contact with a nipped area between the discharge rollers 64, 65, whilst the discharge rollers 64, 65 rotate, the front end of the sheet is drawn into the nipped area. Thus, the upper surface and the lower surface of the sheet contact the circumferences of the discharge rollers 64, 65, respectively, and conveying force from the discharge rollers 64, 65 is applied to the sheet. Thereby, the sheet is conveyed further. When a rear end of the sheet is released from the discharge rollers 64, 65, the sheet is discharged on the upper surface 26 of the discharge tray 4.

Upper CIS Unit

Hereinafter, the upper CIS unit 37 will be described in more detail. As shown in FIG. 4, the upper CIS unit 37 includes a holder 71 to hold the contact glass 38 and a CIS module 72 being accommodated in the holder 71.

The contact glass 38 is formed in a shape of a rectangle piece, of which longer sides extend along the crosswise direction.

The holder 71 includes, as shown in FIGS. 5 and 6, a left-side panel 73, a right-side panel 74, a front panel 75, a rear panel 76, and a bridged panel 77 integrally. The right-side panel 74 is in an opposite position to be spaced apart from the left-side panel 76 along the crosswise direction. The front panel 75 connects front edges of the left-side panel 73 and the right-side panel 74 together, and the rear panel 76 connects rear edges of the left-side panel 73 and the right-side panel 74 together. The bridged panel 77 is bridged between lower edges of the left-side panel 73 and the right-side panel 74 and between lower edges of the front panel 75 and the rear panel 76.

Further beyond the lower edge of the rear panel 76, the bridged panel 77 is extended upper rearward. As shown in FIG. 4, a lower plane of the bridged panel 77 is formed to have a recess 78, which is recessed upward and has a plane size being substantially larger than the contact glass 38, and the contact glass 38 is arranged to fit in the recess 78. The recess 78 is formed to have a depth, which is larger than a thickness of the contact glass 38; therefore, when the contact glass 38 is fitted in the recess 78, the outer (lower) surface of the contact glass 38 is in an upward recessed position with respect to the lower plane of the bridged panel 77.

In the bridged panel 77, in a position opposite from a front edge of the contact glass 38, a slit 79, which allows light to pass there-through, is formed. The slit 79 is formed to extend along the crosswise direction.

Further, the bridged panel 77 has a second upper guide section 80, to guide the sheet being conveyed, in a rearward part with respect to the recess 78. The second upper guide section 80 extends to a vicinity of the front edge of the first upper guide section 30. Furthermore, the second upper guide section 80 is formed to incline upper-rearward with respect to the outer surface of the contact glass 38. Therefore, a lower plane of the second upper guide 80 is retracted in an upper-front position with respect to the lower plane of the first upper guide section 33, i.e., the guide surface 36.

The holder 71 further includes a closure panel 81. The closure panel 81 is arranged to contact upper edges of the left-side panel 73, the right-side panel 74, the front panel 75, and a rear panel 76 and encloses a space surrounded by the left-side panel 73, the right-side panel 74, the front panel 75, and a rear panel 76 from above. The closure panel 81 includes engaged portions 81A. The front side of the closure panel 81 includes engaged portions (not depicted). The rear panel 76 includes engaging portions 76A. The front panel 75 includes engaging portions 75A. When the CIS module 72 is stored in the space surrounded by the left-side panel 73, the right-side panel 74, the front panel 75, and a rear panel 76, the engaged portions 81A are engaged with the engaging portions 76A, and the engaged portions of the front side of the closure panel 81 (not depicted) are engaged with the engaging portions 75A, and the CIS module 72 is held by the holder 71.

The CIS module 72 is, as shown in FIG. 6, stored in the space formed in the holder 71. The CIS module 72 includes a casing 91, which has a shape of a rectangular bar with longer sides thereof extending along the crosswise direction. In the casing 91, optical components, for example, an LED light source, lenses, and an image sensor, may be stored.

On a front face of the casing 91, positioning blocks 92, 93 are formed on a left-side end and a right-side end respectively. The positioning blocks 92, 93 are formed to protrude toward one side in a direction of sheet conveying flow (a "sheet conveying direction") with respect to the outer planes of the contact glasses 38, 45, e.g., frontward. On right-hand sides of the positioning blocks 92, 93 respectively, cylindrical positioning shafts 94, 95 protruding rightward are formed. Further, on an upper side of the positioning block 92 on the left-hand, a positioning groove 96 (see FIG. 7), which is dented toward lower rear and is open upper-frontward, is formed.

In the image scanner 1, the sheet conveying direction is orthogonal to the crosswise direction and extends along the outer surfaces of the contact glasses 38, 45.

As shown in FIG. 6, the rear panel 76 of the holder 71 is formed to protrude rearward at the left-end area and the right-end area thereof In the protruded areas, respectively, insertion blocks 97, 98 are formed. The insertion blocks 97, 98 face rightward to the positioning blocks 92, 93 respectively from the left-hand side. In the insertion blocks 97, 98, respectively, as shown in FIGS. 6 and 7, insertion dents 101, 102 are formed. In the insertion dents 101, 102, the leading edges of the positioning shafts 94, 95 can be inserted rightward from the left-hand side. The insertion dents 101, 102 may be cylindrical holes, of which inner diameters are larger than outer diameters of the positioning shafts 94, 95. Therefore, when the positioning shafts 94, 95 are inserted in the insertion dents 101, 102, the CIS module 72 can be placed in a correct position with respect to the holder 71 along the sheet conveying direction.

Meanwhile, as shown in FIG. 7, in a position opposite from the positioning groove 96, a contact projection 103 is formed in the closure panel 81 to protrude downwardly toward the positioning groove 96. A leading edge of the contact projection 103 is inserted in the positioning groove 96.

Further, as shown in FIG. 6, in a position between the left-side panel 73 of the holder 71 and the casing 91 of the CIS module 72, a piece of sponge 104 is interposed. Therefore, due to resiliency of the sponge 104, the casing 91 is urged rightward, and the leading edge of the contact projection 103 inserted in the positioning groove 96 is in contact with a left-side inner plane 105 of the positioning groove 96. Thus, the CIS module 72 can be placed in a laterally correct position with respect to the holder 71 in the crosswise direction.

Force affecting the CIS module 72 in an opposing direction between the contact glass 45 and the CIS module 112 will be referred to as F11. Further, the urging force from the sponge 104 will be referred to as F12. Meanwhile, a static friction coefficient between the left-side inner plane 105 of the projecting groove 96 and the contact projection 103 will be referred to as $\mu 11$. A static friction coefficient between the casing 91 of the CIS module 72 and the sponge 104 will be referred to as $\mu 12$. A static friction coefficient between the casing 91 of the CIS module 72 and the bridged panel 77 will be referred to as $\mu 13$. In this regard, the sponge 104 is configured to fulfill the following inequality:

$$\mu 13 \cdot F11 < F12 < F11/(\mu 11 + \mu 12) \quad (1)$$

In this regard, the force F11 is force component of gravity affecting the CIS module 112 in the opposing direction between the contact glass 45 and the CIS module 112.

Further, if the contact projection 103 and the bridged panel 77 are made of a same material, and the positioning block 92 having the positioning groove 96 and the casing 91 are made of a same material, the static friction coefficients μ 11 and μ 13 are equal to each other (i.e., μ 11=μ 13).

Lower CIS Unit

Next, lower CIS unit 44 will be described in more detail. As shown in FIG. 4, the lower CIS unit 44 includes a holder 111 to hold the contact glass 45 and a CIS module 112 being accommodated in the holder 111.

The contact glass 45 is formed in a shape of a rectangle piece, of which longer sides extend along the crosswise direction.

The holder 111 includes, as shown in FIGS. 8 and 9, a left-side panel 113, a right-side panel 114 a front panel 115, a rear panel 116, and a bridged panel 117 integrally. The right-side panel 114 is in an opposite position to be spaced apart from the left-side panel 113 along the crosswise direction. The front panel 115 connects front edges of the left-side panel 113 and the right-side panel 114 together, and the rear panel 116 connects rear edges of the left-side panel 113 and the right-side panel 114 together. The bridged panel 117 is bridged between upper edges of the left-side panel 113 and the right-side panel 114 and between upper edges of the front panel 115 and the rear panel 116.

Further beyond the upper edge of the rear panel 116, the bridged panel 117 is extended lower frontward. As shown in FIG. 4, an upper plane of the bridged panel 117 is formed to have a recess 118, which is recessed downward and has a plane size being substantially larger than the contact glass 45, and the contact glass 45 is arranged to fit in the recess 118. The recess 118 is formed to have a depth, which is larger than a thickness of the contact glass 45; therefore, when the contact glass 45 is fitted in the recess 118, the outer (upper) surface of the contact glass 45 is in a downward recessed position with respect to the upper plane of the bridged panel 77.

In the bridged panel 117, in a position opposite from a rear edge of the contact glass 45, a slit 119, which allows light to pass there-through, is formed. The slit 119 is formed to extend along the crosswise direction. The slit 119 is formed in a displaced position with respect to the slit 79 formed in the CIS module 72 of the upper CIS unit 37 along the sheet conveying direction. Therefore, the light emitted from the CIS module 72 is prevented from being received in the CIS module 112 through the slit 119. Meanwhile, the light emitted from the CIS module 112 is prevented from being received in the CIS module 72 through the slit 79.

Further, the bridged panel 117 has a second lower guide section 120, to guide the sheet being conveyed, in a rearward part with respect to the recess 118. The second lower guide section 120 is formed to incline lower-rearward with respect to the outer surface of the contact glass 45. Therefore, an upper plane of the second lower guide 120 is retracted in a lower-front position with respect to the lower plane of the first lower guide section 41, i.e., the guide surface 43.

The holder 111 further includes a closure panel 121. The closure panel 121 is arranged to contact lower edges of the left-side panel 113, the right-side panel 114, the front panel 115, and a rear panel 116 and encloses a space surrounded by the left-side panel 113, the right-side panel 114, the front panel 115, and a rear panel 116 from below. The closure panel 121 includes engaged portions 121A. The rear side of the closure panel 121 includes engaged portions (not depicted).

The rear panel 116 includes engaging portions 116A. The front panel 115 includes engaging portions 115A. When the CIS module 112 is stored in the space surrounded by the left-side panel 113, the right-side panel 114, the front panel 115, and a rear panel 116, the engaged portions 121A are engaged with the engaging portions 115A, and the engaged portions of the rear side of the closure panel 121 (not depicted) are engaged with the engaging portions 116A, and the CIS module 112 is held by the holder 111.

The CIS module 112 is, as shown in FIG. 9, stored in the space formed in the holder 111. The CIS module 112 includes a casing 141, which has a shape of a rectangular box with longer sides thereof extending along the crosswise direction. In the casing 141, optical components, for example, an LED light source, lenses, and an image sensor, may be stored.

On a rear face of the casing 141, positioning blocks 122, 123 are formed on a left-side end and a right-side end respectively. The positioning blocks 122, 123 are formed to protrude toward the other side along the sheet conveying direction with respect to the outer planes of the contact glasses 38, 45, e.g., rearward. On left-hand sides of the positioning blocks 122, 123 respectively, cylindrical positioning shafts 124, 125 protruding leftward are formed. Further, on an upper side of the positioning block 122 on the left-hand, a positioning groove 126 (see FIG. 10), which is dented toward upper front and is open lower-rearward, is formed.

As shown in FIG. 9, the rear panel 116 of the holder 111 is formed to protrude rearward at the left-end area and the right-end area thereof In the protruded areas, respectively, insertion blocks 127, 128 are formed. The insertion blocks 127, 128 face rightward to the positioning blocks 122, 123 respectively from the left-hand side. In the insertion blocks 127, 128, respectively, as shown in FIGS. 9 and 10, insertion dents 131, 132 are formed. In the insertion dents 131, 132, the leading edges of the positioning shafts 124, 125 can be inserted leftward from the right-hand side. The insertion dents 131, 132 may be cylindrical holes, of which inner diameters are larger than outer diameters of the positioning shafts 124, 125. Therefore, when the positioning shafts 124, 125 are inserted in the insertion dents 131, 132, the CIS module 112 can be placed in a correct position with respect to the holder 111 along the conveying direction.

Meanwhile, as shown in FIG. 10, in a position opposite from the positioning groove 126, a contact projection 133 is formed in the closure panel 121 to protrude upwardly toward the positioning groove 126. A leading edge of the contact projection 133 is inserted in the positioning groove 126.

Further, as shown in FIG. 9, in a position between the right-side panel 114 of the holder 111 and the casing 141 of the CIS module 112, a piece of blade spring 134 is interposed. The blade spring 134 is attached at one end thereof to a right-end area of the front panel 115. The blade spring 134 extends therefrom to a vicinity of the right-side panel 114 along the front panel 115 and is bent toward the rear panel 116. A leading edge of the blade spring 134 is in resiliently contact with a rearward-lopsided position on the right-side outer surface of the casing 141. The rearward-lopsided position refers to a position, which is on a side closer to the right-side inner plane 135 than the front along the conveying direction, on the right-side outer surface of the casing 141. Therefore, due to the resiliency of the blade spring 134, the casing 141 is urged leftward, and the leading edge of the contact projection 133 inserted in the positioning groove 126 is in contact with a right-side inner plane 135 of the positioning groove 126. Thus, the CIS module 112 can be placed in a laterally correct position with respect to the holder 111 in the crosswise direction.

Furthermore, in the closure panel 121 of the holder 111, two spring placement portions 136 (see FIGS. 4 and 8), which protrudes lower rearward, are formed in laterally spaced apart positions. In each spring placement portion 136, as shown in FIG. 4, a coil spring 137 is arranged. The coil spring 137 is accommodated in the spring placement portion 136 in a compressed condition between the casing 141 of the CIS module 112 and a bottom of the spring placement portion 136. Due to urging force of the coil springs 137, the casing 141 is urged upper-frontward to be in contact with the bridged panel 117 of the holder 111.

Force affecting the CIS module 112 in an opposing direction between the contact glass 45 and the CIS module 112 will be referred to as F21. Further, the urging force from the blade spring 134 will be referred to as F22. Meanwhile, a static friction coefficient between the right-side inner plane 135 of the projecting groove 126 and the contact projection 133 will be referred to as μ 21. A static friction coefficient between the casing 141 of the CIS module 112 and the blade spring 134 will be referred to as μ 22. A static friction coefficient between the casing 141 of the CIS module 112 and the bridged panel 117 will be referred to as μ 23. In this regard, the blade spring 134 is configured to fulfill the following inequality:

$$\mu 23 \cdot F21 < F22 < F21/(\mu 21 + \mu 22) \quad (2)$$

In this regard, the force F21 is force component of gravity affecting the CIS module 112 in the opposing direction between the contact glass 45 and the CIS module 112 subtracted from the urging force of the coil springs 137.

Further, if the contact projection 133 and the bridged panel 117 are made of a same material, and the positioning block 122 having the positioning groove 126 and the casing 141 are made of a same material, the static friction coefficients μ 21 and μ 23 are equal to each other (i.e., μ 21=μ 23).

As has been described above, in the upper CIS unit 37, the contact glass 38 is held by the holder 71. Further, the CIS module 72 is accommodated in the holder 71. The contact glass 38 and the CIS module 72 extend in the crosswise direction and are in opposite positions from each other. In the CIS module 72, the positioning shaft 94 extending in the crosswise direction is formed. Further, the positioning block 92 is formed on the rear face of the casing 91. The positioning block 92 protrudes from the rear face of the casing 91 toward the one side in the sheet conveying direction, i.e., rearward. In the positioning block 92, the left-side inner plane 105, which rises from the rear face of the casing 91, is formed. Meanwhile, in the holder 71, the insertion dent 101, in which the leading edge of the positioning shaft 94 is inserted, and the contact projection 103, which contacts the left-side inner plane 105 from the right-hand side, are formed. Furthermore, in the position between the left-side panel 73 of the holder 71 and the CIS module 72, the sponge 104 is interposed.

With the leading edge of the positioning shaft 94 being inserted in the insertion dent 101, the CIS module 72 is placed in the correct position with respect to the holder 71 in the sheet conveying direction. Meanwhile, with the left-side inner plane 105 being in contact with the contact projection 103, the CIS module 72 is placed in the correct position with respect to the holder 71 in the crosswise direction.

Further, with the sponge 104, the CIS module 72 is urged in the direction, in which the left-side inner plane 105 faces to contact the contact projection 103, i.e., rightward. Thus, the mutually contacting condition of the left-side inner plane 105 and the contact projection 103 can be steadily maintained. Therefore, the urged CIS module 72 can be prevented from moving in the holder 71 in the crosswise direction, and the CIS module 72 can be placed in the accurate position with respect to the holder 71.

Moreover, the urging force F12 from the sponge 104 is greater than the static friction coefficient μ 13·F11, which is caused between the CIS module 72 and the holder 71. Therefore, with the urging force F12 from the sponge 104, the CIS module 72 can be moved rightward against the static friction coefficient μ 13·F11. Accordingly, the left-side inner plane 105 can be steadily in contact with the contact projection 103.

As has been described above, the urging force F12 from the sponge 104 is smaller than the resultant force of the static friction coefficient μ 11·F11, which is caused between the left-side inner plane 105 and the contact projection 103, and the static friction coefficient μ 12·F11, which is caused between the CIS module 72 and the sponge 104. Therefore, the movement of the CIS module 72 in the opposing direction between the CIS module 72 and the contact glass 38 is not overwhelmed by the urging force F12 from the sponge 104. Accordingly, the positional relation between the contact glass 38 and the CIS module 72 in the opposing direction can be maintained steady.

Further, due to the effect of gravity, weight of the CIS module 72 affects the contact glass 38, and the CIS module 72 tends to move against the contact glass 38. Thus, it may not be necessary that the CIS module 72 is urged against the contact glass 38 forcibly. In other words, an urging member to urge the CIS module 72 against the contact glass 38 may not be necessary.

As has been described above, in the lower CIS unit 44, the contact glass 45 is held by the holder 111. Further, the CIS module 112 is accommodated in the holder 111. The contact glass 45 and the CIS module 112 extend in the crosswise direction and are in opposite positions from each other. In the CIS module 112, the positioning shaft 124 extending in the crosswise direction is formed. Further, the positioning block 122 erects from the rear face of the casing 141. The positioning block 122 protrudes from the rear face of the casing 141 toward the other side in the sheet conveying direction, i.e., rearward. In the positioning block 142, the right-side inner surface plane 135, which rises from the rear face of the casing 141, is formed. Meanwhile, in the holder 111, the insertion dent 131, in which the leading edge of the positioning shaft 124 is inserted, and the contact projection 133, which contacts the right-side inner plane 135 from the left-hand side, are formed. In the position between the right-side panel 114 and the CIS module 112, the blade spring 134 is interposed.

With the leading edge of the positioning shaft 124 being inserted in the insertion dent 131, the CIS module 112 is placed in the correct position with respect to the holder 111 in the sheet conveying direction. Meanwhile, with the right-side inner plane 135 being in contact with the contact projection 133, the CIS module 112 is placed in the correct position with respect to the holder 111 in the crosswise direction.

Further, with the blade spring 134, the CIS module 112 is urged in the direction, in which the right-side inner plane 135 faces to contact the contact projection 133, i.e., leftward. Thus, the mutually contacting condition of the right-side inner plane 135 and the contact projection 133 can be steadily maintained. Therefore, the urged CIS module 112 can be prevented from moving in the holder 111 in the crosswise direction, and the CIS module 112 can be placed in the accurate position with respect to the holder 111.

Moreover, the urging force F22 from the blade spring 134 is greater than the static friction coefficient μ 23·F21, which is caused between the CIS module 112 and the holder 111. Therefore, with the urging force F12 from the blade spring 134, the CIS module 112 can be moved rightward against the static friction coefficient μ 23·F21. Accordingly, the right-side inner plane 135 can be steadily in contact with the contact projection 133.

As has been described above, the urging force F22 from the blade spring 134 is smaller than the resultant force of the static friction coefficient μ 22·F21, which is caused between the right-side inner plane 135 and the contact projection 133, and the static friction coefficient μ 22·F21, which is caused between the CIS module 112 and the blade spring 134. Therefore, the movement of the CIS module 112 in the opposing direction between the CIS module 112 and the contact glass 45 is not overwhelmed by the urging force F22 from the blade spring 134. Accordingly, the positional relation between the contact glass 45 and the CIS module 112 in the opposing direction can be maintained steady.

Furthermore, the blade spring 134 is attached to the right-end area of the front panel 115 at the one end thereof and extends therefrom to the vicinity of the right-side panel 114 along the front panel 115. The blade spring 134 is bent thereat toward the rear panel 116. The leading edge of the blade spring 134 is in contact with the rearward position on the right-side outer surface of the casing 141.

Therefore, due to the arrangement of the blade spring 134, the CIS module 112 can prevent rotation moment from being generated by the urging force of the blade spring 134. Accordingly, clearance between the contact glass 45 and the CIS module 112 can be evenly maintained throughout the crosswise length of the CIS module 112.

The CIS module 112 further has the coil spring 137, which urges the CIS module 112 upwardly toward the contact glass 45. Thereby, the CIS module 112 is prevented from moving in the opposing direction between the CIS module 112 and the contact glass 45. Accordingly, the CIS module 112 can be placed in the accurate position in the holder 111.

Thus, the image scanner 1 has the upper CIS unit 37 and the lower CIS unit 44, in which the CIS module 72, 112 are placed in accurately correct positions with respect to the holders 71, 112 respectively. Therefore, the images appearing on the upper and lower sides of the sheet can be accurately read.

Furthermore, in the upper CIS unit 37, the CIS module 72 is urged to the bridged panel 77 by the gravity affecting the CIS module 72. In this regard, the urging force to urge the CIS module 72 leftward can be sufficient as long as moving between the holder 71 and the CIS module 72 is avoided. Therefore, although a blade spring may be used in place of the sponge 104 to urge the CIS module 72 rightward, whilst the blade spring may be more costly, the piece of sponge 104, which can be acquired more cost-effectively, can be used to urge the CIS module 72.

More Examples

Although an example of carrying out the disclosure have been described, those skilled in the art will appreciate that there are numerous variations and permutations of the image reading unit and the image reading apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, it may not necessarily be applied to the image scanner 1 but may be applied to, for example, a laser printer and a copier, which has a function to read an image.

What is claimed is:

1. An image reading apparatus, comprising:
a roller configured to convey a sheet; and
an image reading unit comprising:
a contact glass extending in a first direction;
a contact image sensor module extending in the first direction and comprising:
a shaft extending in the first direction; and
a protrusion protruding from the contact image sensor module in a second direction orthogonal to the first direction;
a holder configured to accommodate the contact image sensor module and comprising:
an insertion section denting toward the first direction to allow a leading edge of the shaft to be inserted;
a contact section contacting the protrusion from one side in the first direction; and
a panel supporting the contact glass;
a first urging member interposed between a surface of the contact image sensor module and a surface of the holder and configured to urge the contact image sensor module toward the one side in the first direction, the surface of the contact image sensor module and the surface of the holder facing each other in the first direction; and
a second urging member arranged between the holder and the contact image sensor module, the second urging member being configured to urge the contact image sensor module toward the contact glass,
wherein:
the image reading unit is configured such that a condition expressed by an inequality $\mu 3 \cdot F1 < F2 < F1/(\mu 1 + \mu 2)$ is fulfilled,
where F1 represents a force affecting the contact image sensor module in an opposing direction between the contact glass and the contact image sensor module opposing each other, the force F1 is a resultant force of a second urging force from the second urging member and a force component of gravity affecting the contact image sensor module in the opposing direction,
where F2 represents a first urging force from the first urging member,
where μ1 represents a static friction coefficient between the protrusion and the contact section,
where μ2 represents a static friction coefficient between the contact image sensor module and the first urging member, and
where μ3 represents a static friction coefficient between the contact image sensor module and the panel;
the protrusion and the contact section are configured to cause a static friction force $\mu 1 \cdot F2$ therebetween; and
the contact image sensor module and the first urging member are configured to cause a static friction force $\mu 2 \cdot F2$ therebetween.

2. The image reading apparatus according to claim 1, wherein the first urging member is a blade spring.

3. The image reading apparatus according to claim 2, wherein one end of the blade spring is attached to the holder on an opposite side in the second direction from a side of the protrusion, on which the protrusion is arranged in the image sensor module, and an other end of the blade spring is in contact with a surface of the contact image sensor module on an other side in the first direction, in a position on the surface on a side closer to the side of the protrusion than the opposite side in the second direction.

4. The image reading apparatus according to claim 1, wherein the second urging member is a coil spring.

5. The image reading apparatus according to claim 1,
wherein the protrusion comprises a positioning groove denting in a third direction perpendicular to the first direction and the second direction, and
wherein the contact section comprises a contact projection protruding in the third direction, a leading edge of the contact projection is inserted in the positioning groove and is in contact with an inner plane of the positioning groove from the one side in the first direction.

6. The image reading apparatus according to claim 1,
wherein the contact image sensor module is arranged below the contact glass.

7. An image reading apparatus, comprising:
an image reading unit comprising:
  a contact glass extending in a first direction;
  a contact image sensor module arranged above the contact glass, the contact image sensor module extending in the first direction and comprising:
    a shaft extending in the first direction; and
    a protrusion protruding from the contact image sensor module in a second direction orthogonal to the first direction;
  a holder configured to accommodate the contact image sensor module and comprising:
    an insertion section denting toward the first direction to allow a leading edge of the shaft to be inserted;
    a contact section contacting the protrusion from one side in the first direction; and
    a panel supporting the contact glass; and
  a first urging member interposed between a surface of the contact image sensor module and a surface of the holder and configured to urge the contact image sensor module toward the one side in the first direction, the surface of the contact image sensor module and the surface of the holder facing each other in the first direction, wherein:
the image reading unit is configured such that a condition expressed by an inequality $\mu \cdot F1 < F2 < F1/(\mu1 = \mu2)$ is fulfilled,
  where F1 represents a force component of gravity affecting the contact image sensor module,
  where F2 represents a first urging force provided by the first urging member,
  where $\mu1$ represents a static friction coefficient between the protrusion and the contact section,
  where $\mu2$ represents a static friction coefficient between the contact image sensor module and the first urging member, and
  where $\mu3$ represents a static friction coefficient between the contact image sensor module and the panel;
the protrusion and the contact section are configured to cause a static friction force $\mu1 \cdot F2$ therebetween; and
the contact image sensor module and the first urging member are configured to cause a static friction force $\mu2 \cdot F2$ therebetween.

8. The image reading apparatus according to claim 7, wherein the first urging member is a blade spring.

9. The image reading apparatus according to claim 8,
wherein one end of the blade spring is attached to the holder on an opposite side in the second direction from a side of the protrusion, on which the protrusion is arranged in the image sensor module, and an other end of the blade spring is in contact with a surface of the contact image sensor module on an other side in the first direction, in a position on the surface on a side closer to the side of the protrusion than the opposite side in the second direction.

10. The image reading apparatus according to claim 7,
wherein the protrusion comprises a positioning groove denting in a third direction perpendicular to the first direction and the second direction, and
wherein the contact section comprises a contact projection protruding in the third direction, a leading edge of the contact projection is inserted in the positioning groove and is in contact with an inner plane of the positioning groove from the one side in the first direction.

11. The image reading apparatus according to claim 7, wherein the first urging member is a sponge.

* * * * *